United States Patent
Tremblay

(10) Patent No.: US 10,179,692 B2
(45) Date of Patent: Jan. 15, 2019

(54) BOTTLE SHIPPING ASSEMBLY

(71) Applicant: SOLUTIONS ZENPAC INC., Montreal (CA)

(72) Inventor: Benoit Tremblay, Montreal (CA)

(73) Assignee: SOLUTIONS ZENPAC INC., Montreal (CA)

( * ) Notice: Subject to any disclaimer, the term of this patent is extended or adjusted under 35 U.S.C. 154(b) by 180 days.

(21) Appl. No.: 14/532,763

(22) Filed: Nov. 4, 2014

(65) Prior Publication Data

US 2015/0129447 A1 May 14, 2015

Related U.S. Application Data

(60) Provisional application No. 61/902,735, filed on Nov. 11, 2013.

(51) Int. Cl.
*B65D 85/30* (2006.01)
*B65D 81/05* (2006.01)

(52) U.S. Cl.
CPC .......... *B65D 85/30* (2013.01); *B65D 81/058* (2013.01); *Y02W 30/807* (2015.05)

(58) Field of Classification Search
CPC .... B65D 85/307; B65D 85/305; B65D 85/30; B65D 85/20; B65D 81/113; B65D 81/133; B65D 81/058; B65D 81/02; B65D 81/03; B65D 81/022; B65D 81/025; B65D 81/127; B65D 25/02; B65D 25/107; B65D 5/50; Y02W 30/807
USPC ....... 206/433, 446, 521, 320, 588, 277, 784, 206/587, 591, 592, 594, 590
See application file for complete search history.

(56) References Cited

U.S. PATENT DOCUMENTS

| | | | | |
|---|---|---|---|---|
| 3,468,469 A | * | 9/1969 | Kossoff ................ | B65D 5/6632 229/128 |
| 4,832,190 A | * | 5/1989 | Favreau ................. | B65D 85/68 206/320 |
| 5,704,485 A | * | 1/1998 | Cautereels ............. | A45C 11/20 206/541 |
| 7,789,239 B2 | * | 9/2010 | Juliano .................. | B65D 5/503 206/564 |
| 8,230,997 B1 | * | 7/2012 | McWilliams ........ | B65D 5/5038 206/139 |
| 2010/0326858 A1 | * | 12/2010 | Williams ............. | B65D 81/113 206/429 |

(Continued)

*Primary Examiner* — Anthony D Stashick
*Assistant Examiner* — James M Van Buskirk
(74) *Attorney, Agent, or Firm* — Mila Shvartsman

(57) ABSTRACT

The present invention relates to a bottle shipment assembly that can withstand shock and impact during shipping. The assembly can accommodate a wide variety of bottles, uses very little material such as HDPE and PVC, and is easily recyclable. There are three parts to the assembly: a neck portion that locks around the bottle's neck, a base portion that snugly fits around the bottle's bottom, and an exterior box that securely and immovably houses the bottle fitted with the neck portion and base portion. The neck portion has a center portion and two wings that move from inoperable to operable position. The center portion has with a head-engagement recess that slips over the bottle's neck. In operable position, the neck portion has a square configuration, and fits snugly inside the exterior box. The base portion also has a square configuration that fits snugly inside the exterior box.

7 Claims, 12 Drawing Sheets

(56) References Cited

U.S. PATENT DOCUMENTS

2012/0104778 A1\* 5/2012 Mana ................. B60R 19/18
293/133

\* cited by examiner

BOTTLE SHIPPING ASSEMBLY

This application claims priority of Provisional application No. 61/902,735 filed on Nov. 11, 2013. The present invention relates to a packing and shipping assembly for fragile items, more specifically glass bottles. The present assembly requires very little material to accomplish safe transport of bottles due to its novel construction, and all material is fully recyclable.

BACKGROUND

There are many existing assemblies for shipping or transporting one or a plurality of glass bottles. For example, if a wine enthusiast residing in North America wishes to try a particular wine from a particular French vineyard, safely shipping this bottle requires a certain amount of shock-absorbing material. Also, due to current FAA regulations, it is impossible to bring liquids as carry-on baggage, and passengers require a safe method to pack glass bottles in their checked luggage without the risk of the glass bottle breaking during baggage manipulation by airline crew.

There is known U.S. Pat. No. 8,230,997 for BOTTLE SUPPORT FOR PACKAGING AND SHIPPING, which discloses an invention to safely ship one, two or three bottles. The disadvantages of this invention are two-fold: firstly, more time is required to fabricate the assembly from inoperable to operable mode by folding its structural members, and secondly, gluing may be required to achieve structural rigidity of the assembly.

There is also known U.S. Pat. No. 7,311,201 for a PACKING CONTAINER FOR A BOTTLED COMMODITY. This invention protects a glass bottle from heat fluctuation and impact, but is limited to only one size of bottle and cannot adapt to a variety of bottle shape and sizes.

The present invention offers advantageous solutions to the problems posed by prior art: the assembly adapts to many different styles of bottles, does not require prior fabrication, is very quick and easy to attach to bottles, and uses significantly less material.

OBJECT OF THE PRESENT INVENTION

The present invention aims to improve efficiency of packaging material for shipping bottles and reduce the amount of packaging. This is accomplished through an assembly of three parts: a molded neck portion, a molded base portion and an exterior box. All parts are made from reusable, recyclable material.

The present assembly is adapted to accommodate many different shapes and sizes of bottles, is installed within a matter of seconds, and can withstand the most severe shocks and impacts that are associated with standard shipping conditions. The assembly parts are designed to nest within each other, saving on storage space, easily accessible to be assembled as shown on FIGS. 18 and 19.

It is the object of the present invention to eliminate the prerequisite of glue, staples, tape or other binding means to securely attach the assembly to a bottle. All components are immobilized by either snapping locking means or a snug fit to create a pocket of space around a bottle to absorb shocks and impacts associated with transport.

The invention's object is accomplished by spreading out the undesirable effects of impact and shocks. Rather than immobilize the bottle by the head, it is held in place by its neck, thus distributing load more evenly and preventing stress failures. The present assembly can be used for displays of fancy bottles, due to the fact that the label remains unobstructed and it is feasible to package the bottles in gift boxes with windows so that the consumer can see the bottle inside the box.

The present invention accommodates secure fastening of a label without use of glue, which is a formidable advantage since glue is detrimental to the recycling process.

DETAILED DESCRIPTION OF THE PREFERRED EMBODIMENT

The present invention discloses an assembly for safely shipping bottles. It can be used for single bottles or a plurality of bottles. The assembly comprises three parts: bottle neck portion, bottle base portion, and box. In the preferred embodiment, said neck and base portions are made from molded plastic, and said box is made of cardboard. However, other materials can be used, such as pulp and paper products, organic or synthetic materials, as long as they provide adequate balance between rigidity, compression and flex. It is a further advantage of the present invention that all materials can be reused and recycled, and no glue is used to interfere with the recycling process. Materials such as HDPE and PVC are easily recyclable, and the shape can be thermoformed or made with injection molding.

Figure 1:
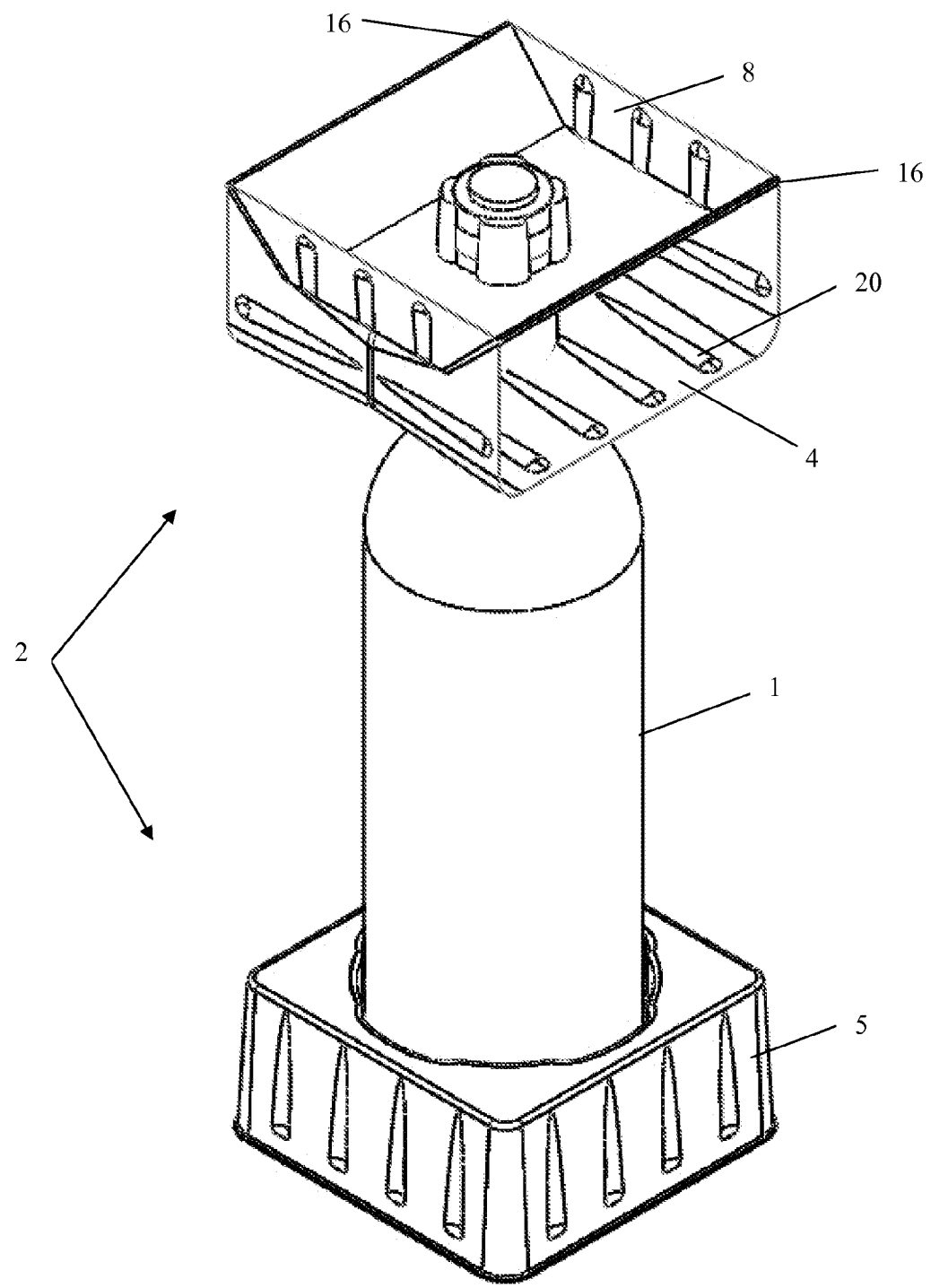
FIG. 1 is a perspective view of the assembly of the present invention prior to insertion into its box.

Referring to FIG. 1, bottle 1 is sandwiched between bottle shipping assembly 2's neck portion 4 and base 5. In the preferred embodiment, neck portion 4 and base 5 are manufactured by molding 100% recyclable clear PVC plastic sheet. It is an important feature of the present invention that shipping assembly 2 can be manufactured out of recyclable material. Other materials are possible, as long as they meet similar impact-resistant characteristics. Such materials include pulp and paper, corn, and other biodegradable material.

Figure 2:
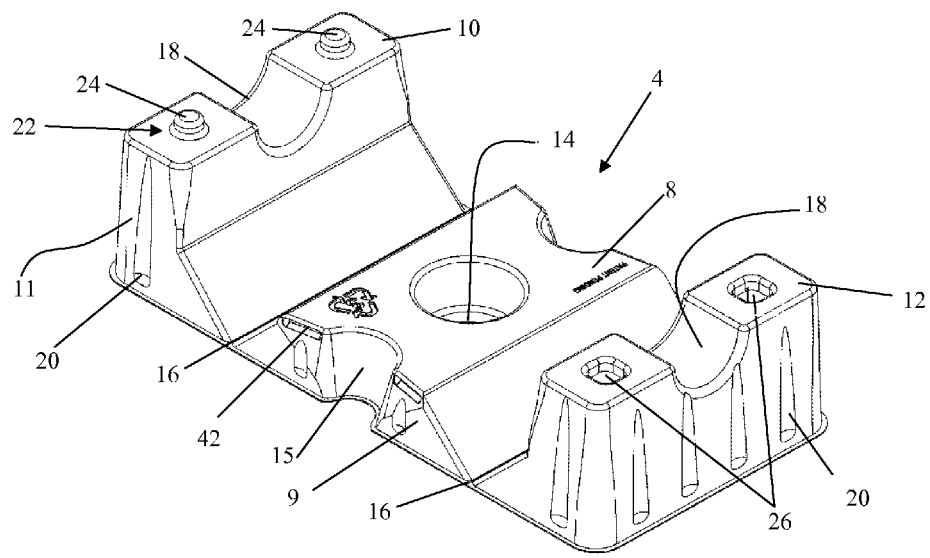
FIG. 2 is a perspective view of the bottle neck portion of FIG. 1.
Figure 3:
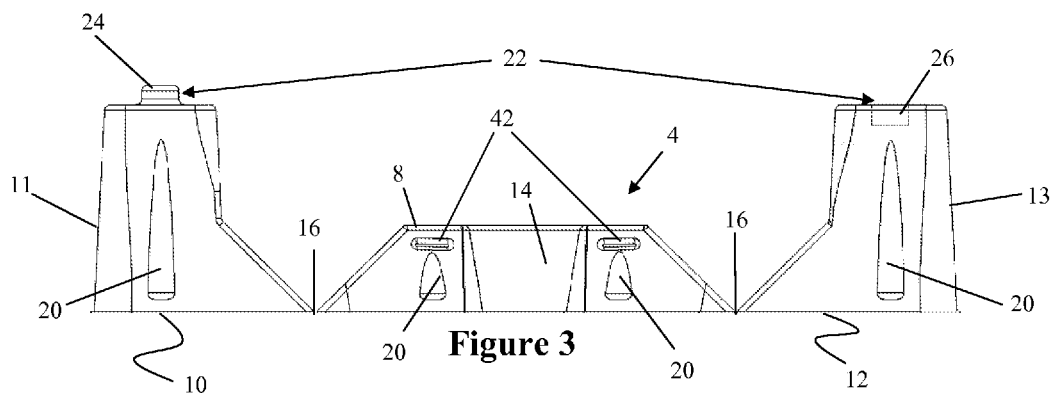
FIG. 3 is a side view of the bottle neck portion of FIG. 2.

As can be seen on FIGS. 2 and 3, in its storage and inoperable mode, neck portion 4 comprises center portion 8, male wing 10 and female wing 12. Wings 10 and 12 are attached to center portion 8 by hinges 16. Center portion 8, substantially of a square configuration, comprises head engagement recess 14 substantially in its center, said recess 14 being adapted to slip over a bottle's head, and is of a configuration to accommodate a multitude of different head shapes. A label can be held in place with four protruding label locks 42, located adjacent to finger access recesses 15 molded into the sides of neck portion 4's center portion 8.

Two hinges 16 are located at opposite extremities of center portion 8, and two ribs 9 at adjacent extremities. Ribs 9, oriented in the same plane as recess 14, comprise stress crimps 20, said crimps 20 enhancing rigidity of neck portion 4 by interrupting bending forces that may be exerted on assembly 2 during transport. Ribs 9 have a trapezoidal configuration, the lower angles being substantially 135° and upper angles being substantially 45°.

Male wing 10, attached by hinge 16 to center portion 8, comprises rib 11 at the opposite extremity of hinge 16. Stress crimps 20 are molded into rib 11, and half-cylindrical concave neck engagement half-recess 18 is molded into male wing 10's extremity. Two male portions 24 of locking means 22, one on either side of half-recess 18, comprise round protrusions extending substantially in the same plane as recess 14. Locking means 22 of said male portion 24 and locking means 22 of said female portion 26 are adapted to be securely locked to each other when around the neck of said bottle 1. As seen on FIG. 3, the shape of rib 11 can be broken down into a rectangle and an equilateral triangle (45°-45°-90°), one of said triangle's 45° angles being immediately adjacent to hinge 16.

Female wing 12, attached by hinge 16 to center portion 8, comprises rib 13 at the opposite extremity of hinge 16. Stress crimps 20 are molded into rib 13, and half-cylindrical concave neck engagement half-recess 18 is molded into female wing 12's lower extremity. Two female portions 26 of locking means 22, one on either side of half-recess 18, comprise square recesses substantially in the same plane as recess 14. As seen on FIG. 3, the shape of rib 12 can be broken down into an equilateral triangle (45°-45°-90°) and a rectangle, one of said triangle's 45° angles being immediately adjacent to hinge 16.

It is important to note that half-cylindrical concave neck engagement half-recess 18 of wing 10 (see FIG. 2) is a mirror image of half-recess 18 on wing 12, presuming that the mirror is oriented in the same plane as recess 14, perpendicular to the orientation of wings 10 and 12. In its inoperable, storage mode, neck portion 4 is designed to nest within other neck portions 4 in order to save space, as seen on FIG. 18.

Figure 4:
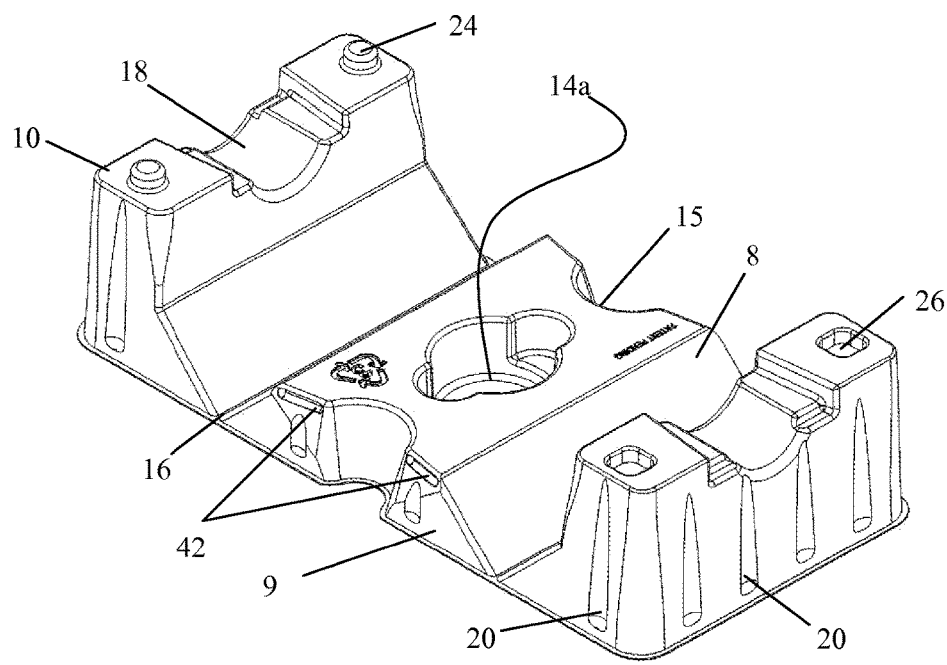
FIG. 4 is a perspective view of the bottle neck portion on a bottle neck for a champagne type of bottle.

FIG. 4 shows the second modification of neck portion 4 provided with head recess 14a used for bottle with a champagne or mushroom type cork retained with a muselet, or wire cage. Recess 18 is adapted to securely accommodate neck 27 of bottle 1 of various diameters.

Figure 5:
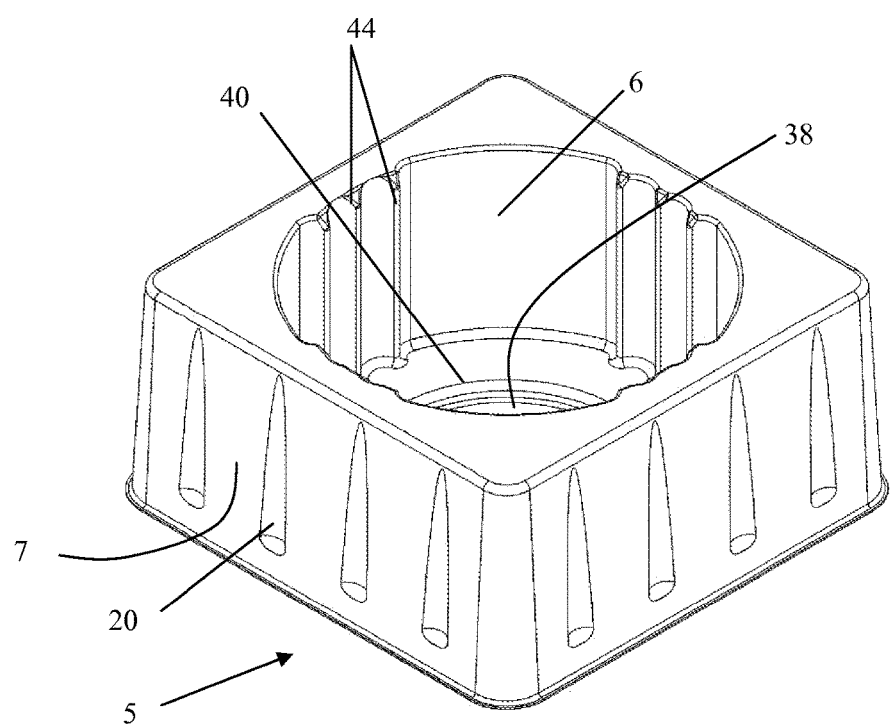
FIG. 5 is a perspective view of base portion of FIG. 1.

FIG. 5 shows a perspective view of the base portion 5 of the present invention for beer or champagne-type bottles. Gap 38 creates a pocket of space for bottle 1 that is supported by ridge 40. Twelve ribs 44 grip bottle 1's base, and are designed to collapse or fold in case bottle 1 is wider than cavity 6 without compromising immobilization of bottle 1 inside base 5.

Figure 6:
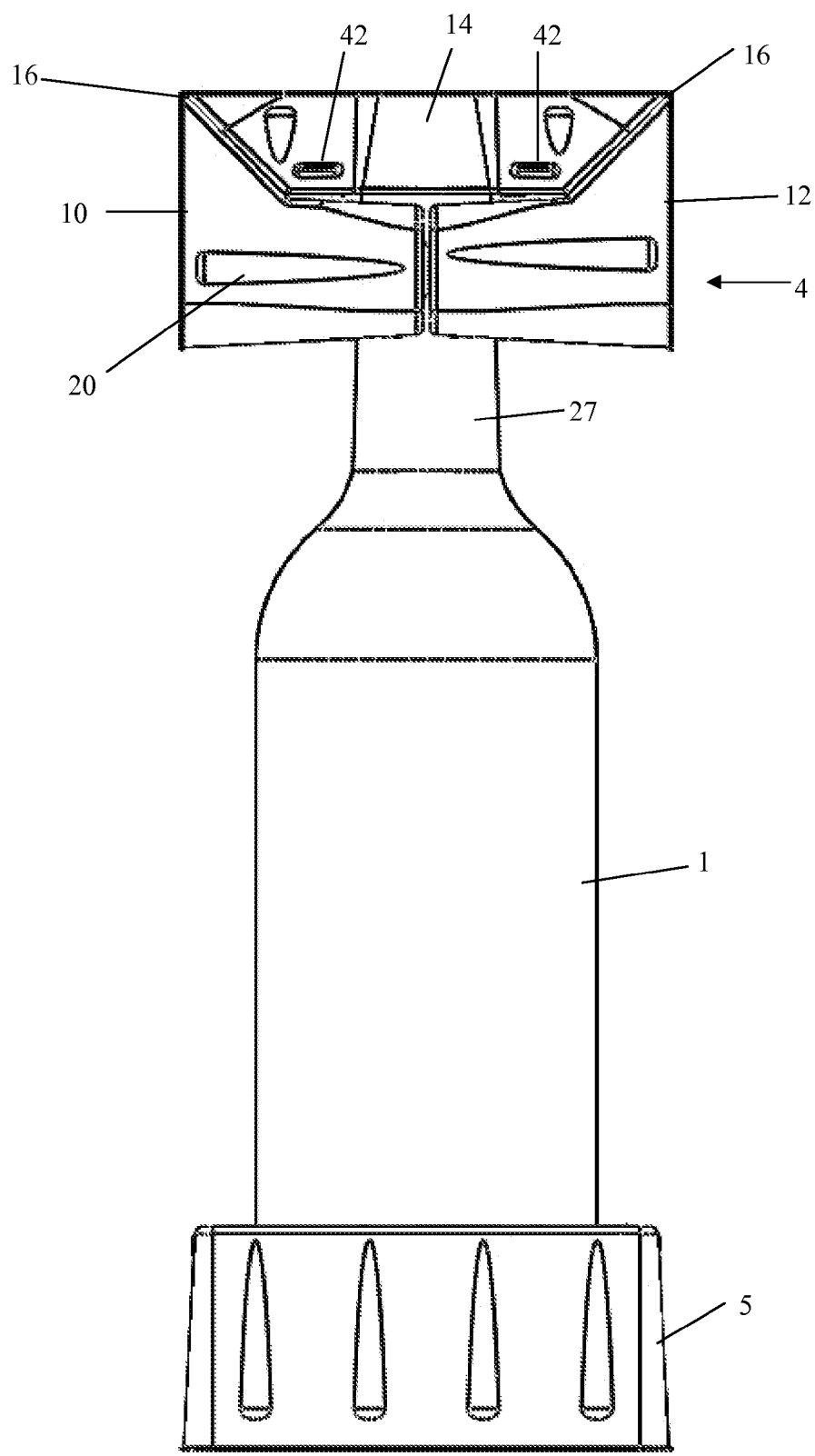
FIG. 6 is a side view of the assembly of FIG. 1.

Referring to FIGS. 1 and 6, neck portion 4 is shown in operable mode on bottle 1. Locking means 22 are engaged, and bottle 1's head is inside recess 14. As seen on FIG. 6, wings 10 and 12 are folded along hinges 16 and locking means 22 comprises immobilized round male portions 24 inside square female portions 26. Said 45° angles of ribs 9, 11 and 13 cooperate to form operational embodiment of neck portion 4, and stress crimps 20 offer rigidity in all planes. The circumference of bottle 1's neck 27 is surrounded by half-recesses 18 of wings 10 and 12, and bottle 1's head is snug within recess 14.

As seen on FIGS. 1, 8, 16 and 17, base portion 5 for wine bottles, substantially of a square configuration, comprises concave recess 6 and rib 7. Recess 6, substantially in the center of base 5, is adapted to receive bottle 1's base portion. Rib 7 comprises the shell of base 5, flanging slightly outwardly from top to bottom relative to bottle 1's vertical plane. Stress crimps 20, oriented in the vertical plane, are molded into rib 7. As can be seen on FIGS. 15 and 17, rib 7's lowest edge extends past the lowest point of recess 6, thus forming a gap 38 located below base portion 5. As seen on FIGS. 8, 16 and 17, wine bottle base 5's recess or cavity 6 has formed cavities 40a and 40b provided for various diameters of bottle 1 bases. Base portion 5 is adapted to snugly fit around a bottom portion of said bottle 1. Base portion 5 is designed to nest within other bases 5 in order to save storage space, as seen on FIG. 19.

Figure 7:
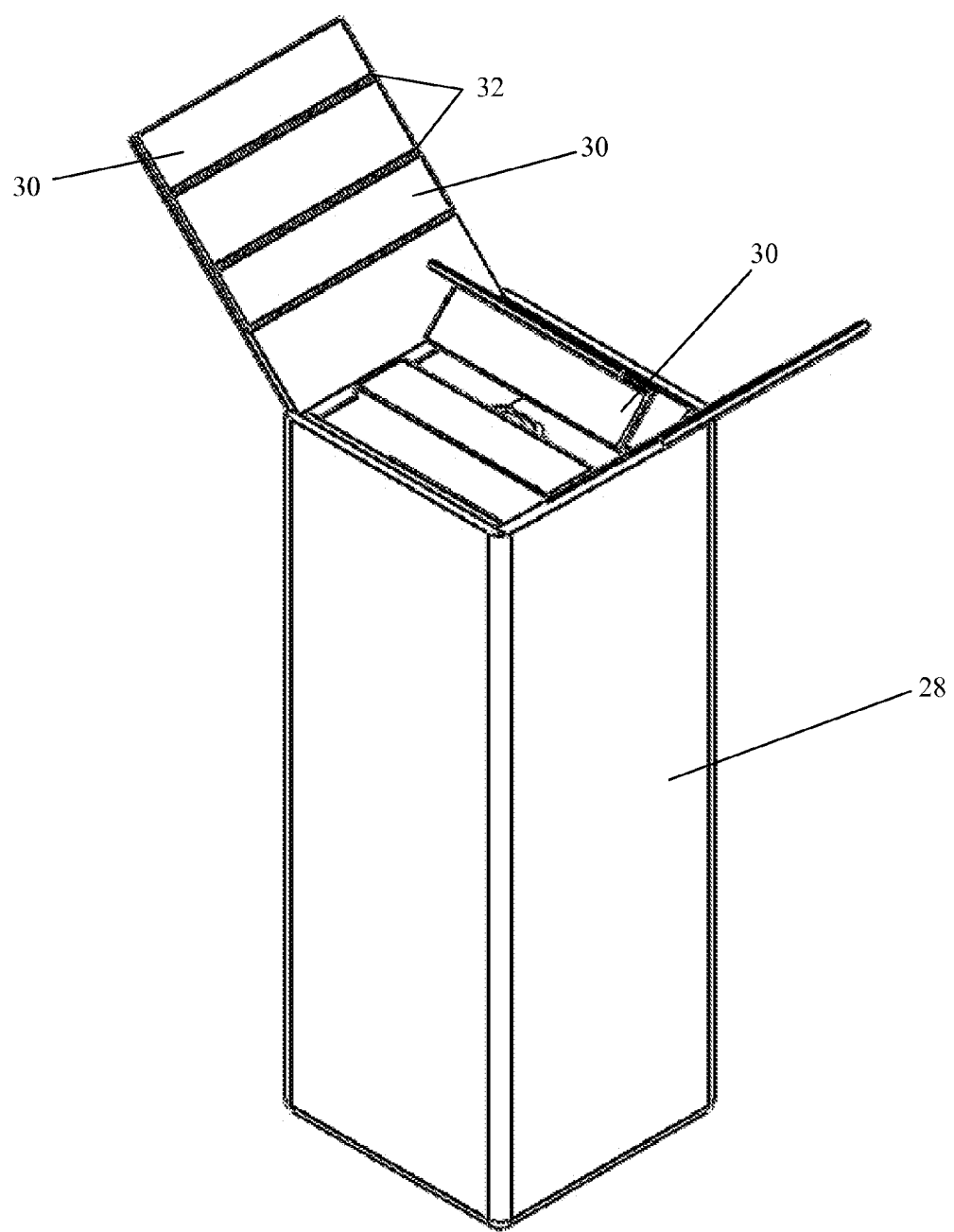
FIG. 7 is a perspective view of the present invention inserted into the exterior box.
Figure 8:
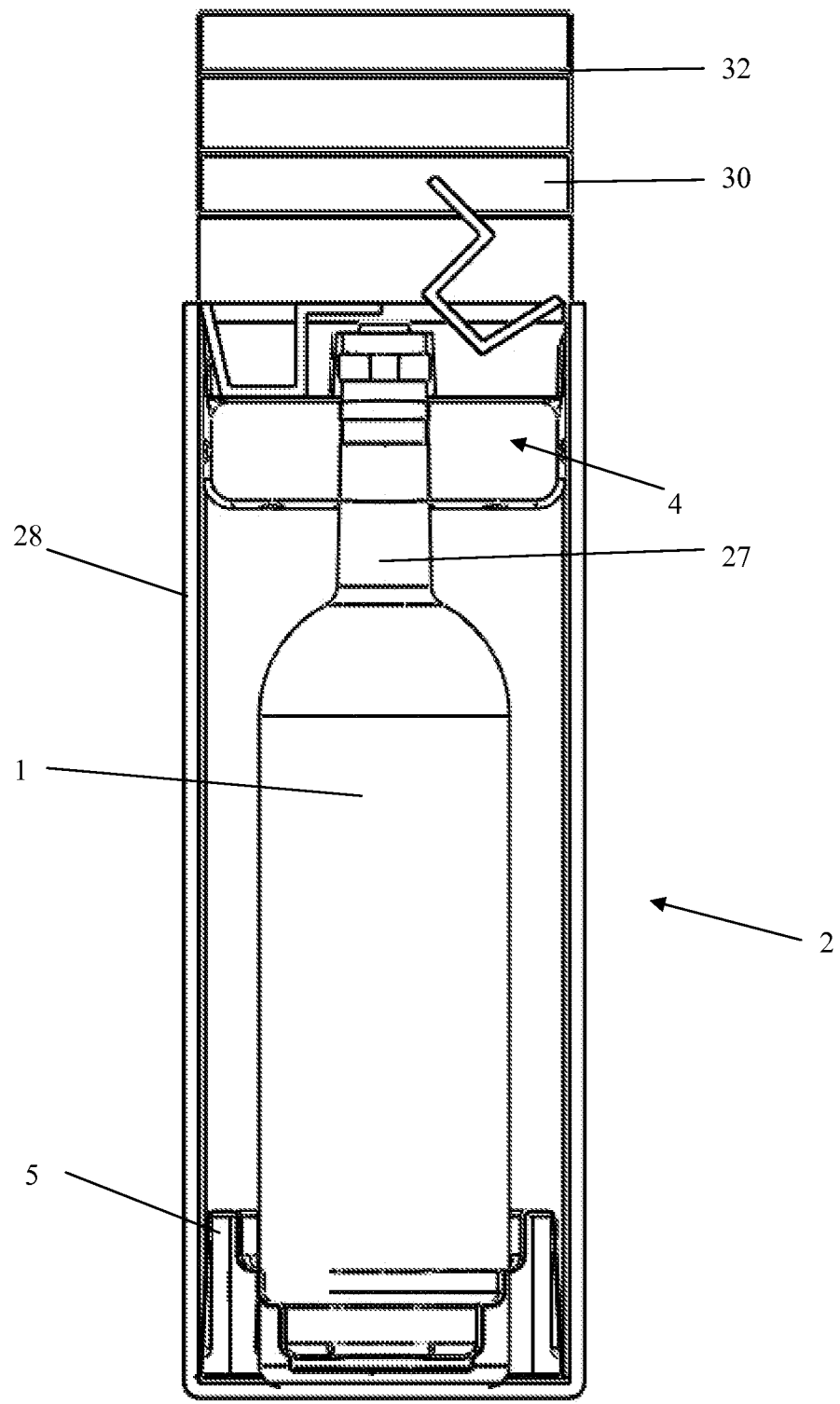
FIG. 8 is a cross-section side view of FIG. 7.

FIGS. 7 and 8 shows assembly 2 inside box 28. Box 28 is configured in such a way that the bottommost part of box 28 is substantially identical to the dimensions of base 5's rib 7 at its flange's widest part, and the top of box 28 comprises flaps 30. Said flaps 30 are adapted to exert downward pressure on neck portion 4 to snugly sandwich bottle 1 between neck portion 4 and base 5. Flaps 30 comprise rigid segments connected by hinges 32. If bottle 1 is shorter than the height of box 28, the user can occupy the unused space above bottle 1 by folding flaps 30 in such a way that they create a rigid buffer between top of bottle 1 and top of box 28. Flaps 30 accomplish an important feature of the present invention: bottle 1 must be kept immobile between neck portion 4 and base 5.

Figure 9:
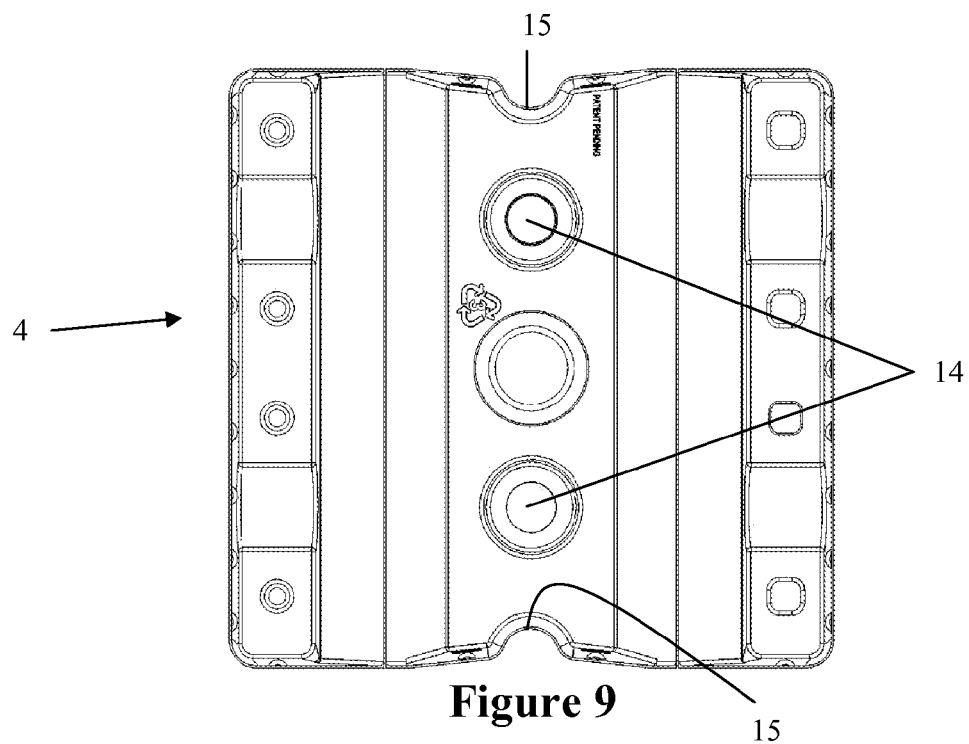
FIG. 9 is a top view of the second modification of neck portion.

FIG. 9 discloses another embodiment of the present invention, namely finger access recesses 15 molded on neck portion 4. Said recesses 15 permit a user to grab neck portion 4 to pull it off bottle 1 while the present assembly 2 is still inside box 28. This embodiment is necessary for certain types of bottles, to facilitate user's safe removal of bottle 1 out of box 28.

Figure 10:
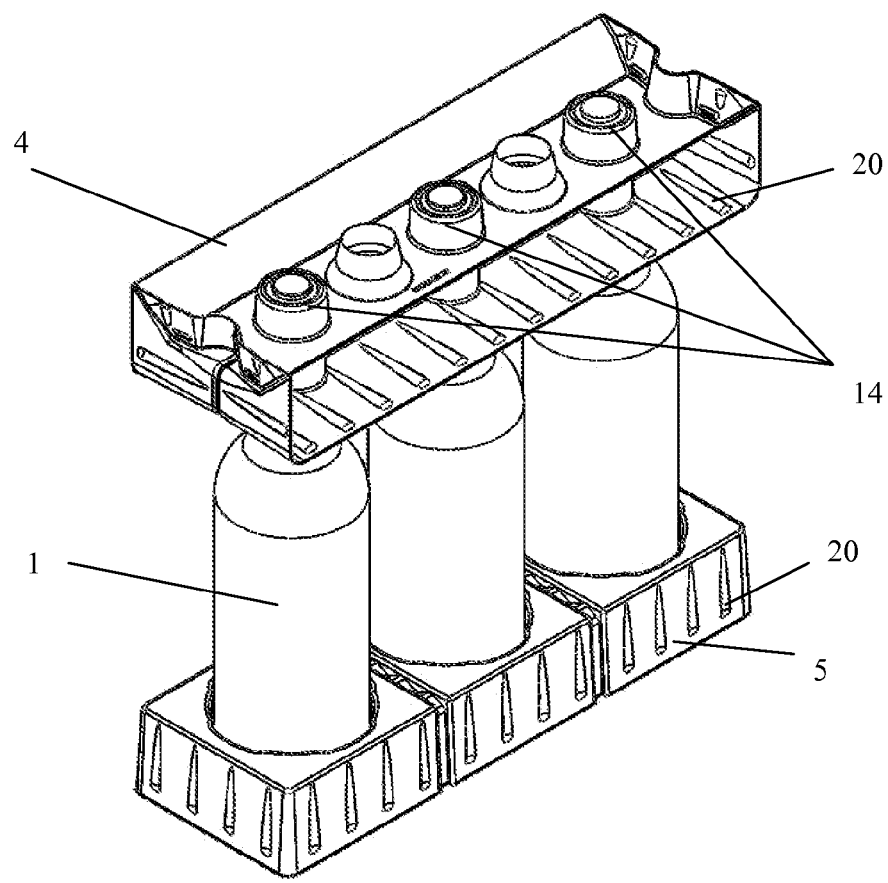
FIG. 10 is a perspective view of a third modification of the present invention accommodating three bottles.
Figure 11:
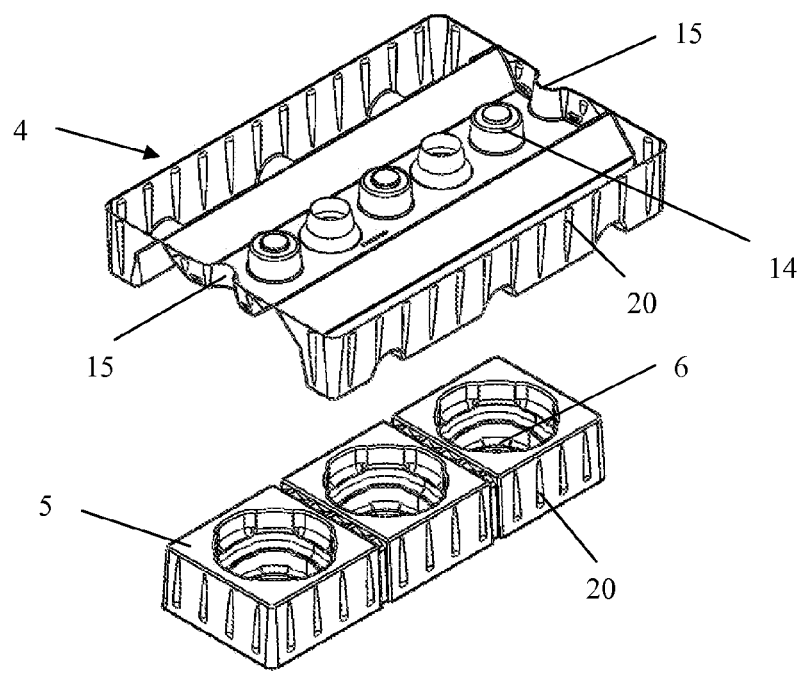
FIG. 11 shows perspective view of neck and base portions shown on FIG. 10.

FIGS. 10 and 11 show another embodiment of the present invention provided to accommodate three bottles. In this embodiment, three neck portions 4 are connected side by side and three base portions 5 are also connected side by side. In this case, exterior box is modified to accommodate six bottles comprising two rows of three-bottle assemblies 2.

This invention is not restricted to three-bottle assemblies. It can also be made for two bottles, wherein two neck 4 and base 5 potions are connected side by side as shown on FIGS. 9 and 14.

Figure 12:
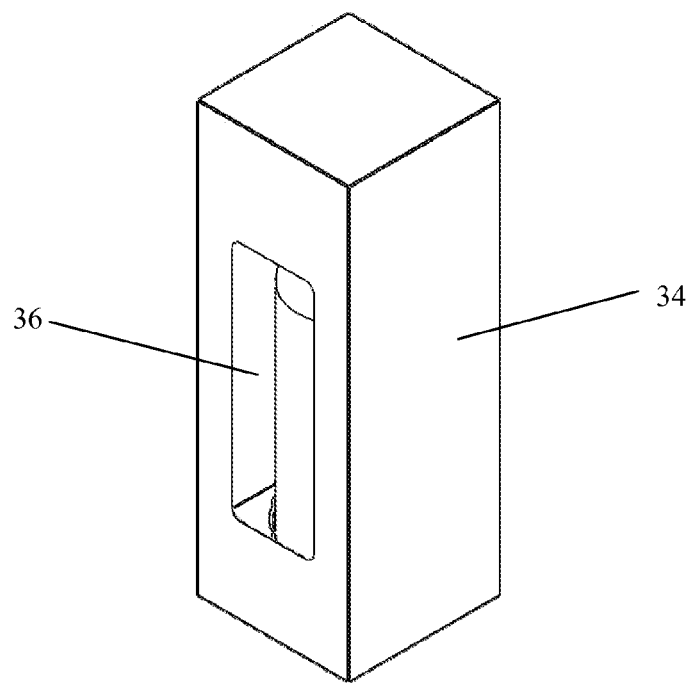
FIG. 12 shows a perspective view of a bottle inside the gift box of the present invention.
Figure 13:
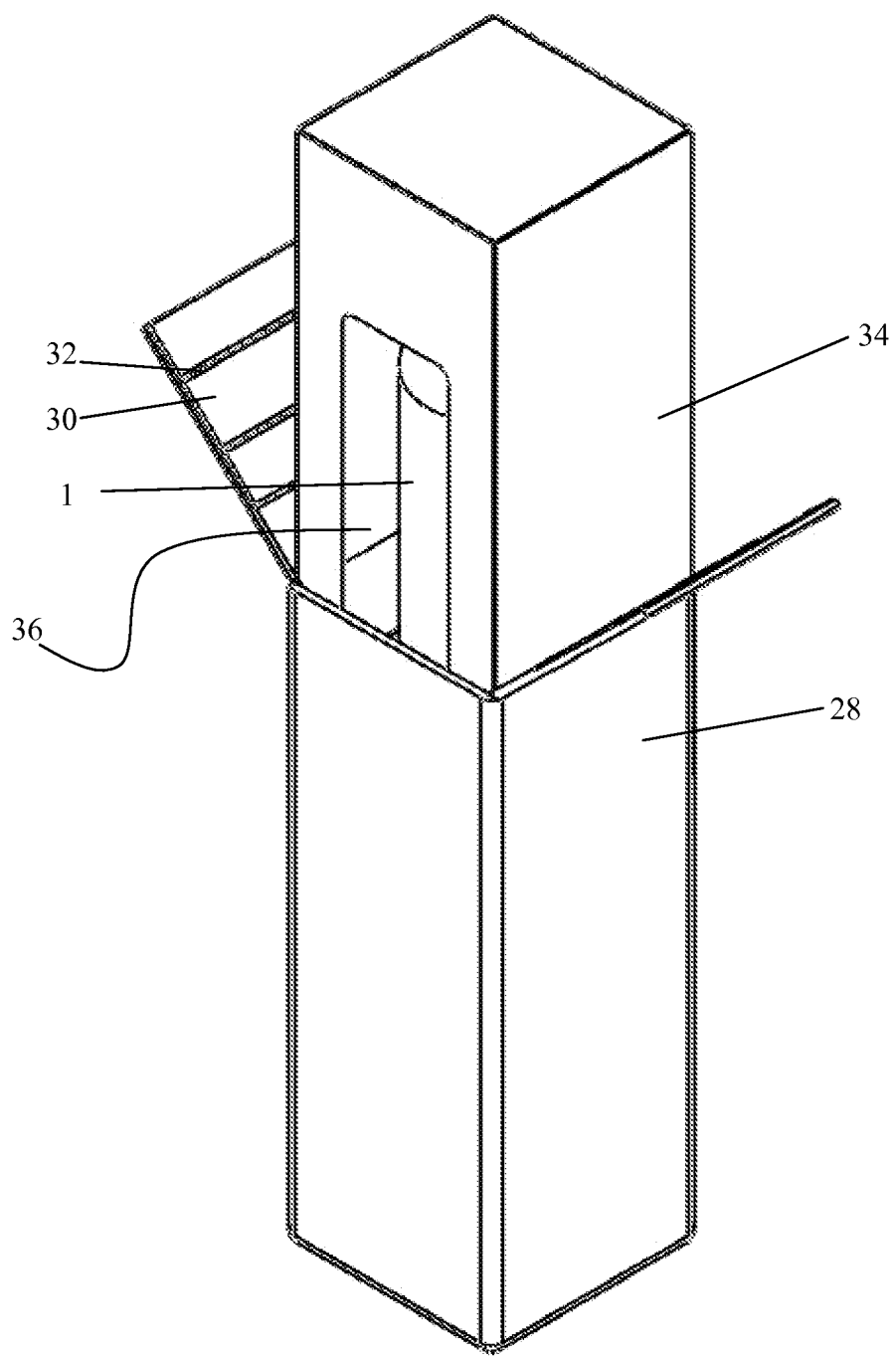
FIG. 13 shows a perspective view of the present invention with gift box inserted into the exterior box.

FIGS. 12 and 13 show a gift box 34 provided with a label display window 36 that is adapted to be snugly placed within exterior box 28. In this arrangement, the user can see the bottle 1's label unobstructed without removing bottle 1 from gift box 34. The purpose of this arrangement is to keep the label of an expensive bottle 1 undamaged and unscratched, which is an important advantage of the present invention.

Figure 14:
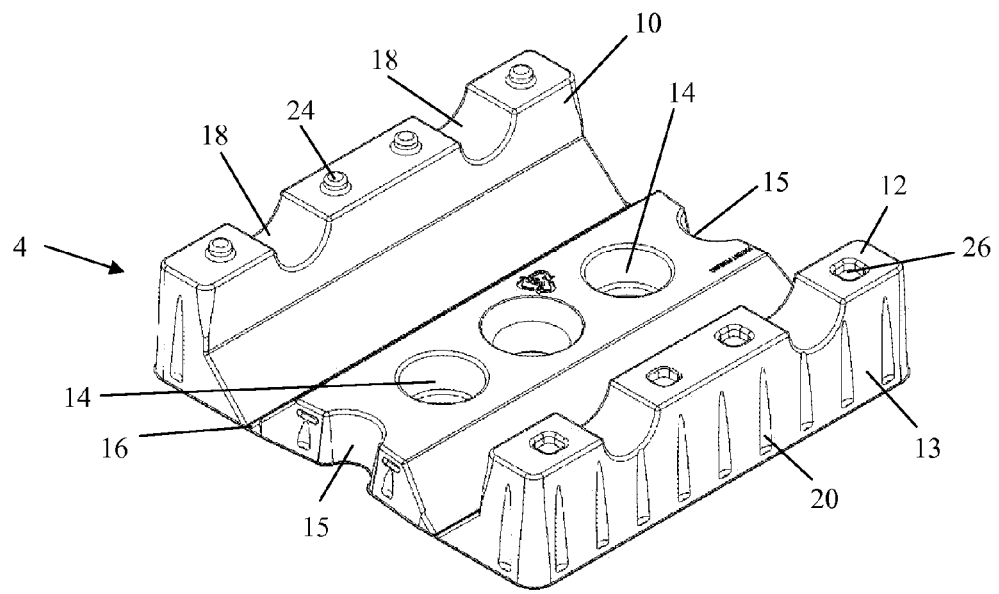
FIG. 14 shows a perspective view of the neck portion shown on FIG. 9.

FIG. 14 shows a neck portion 4 designed to accommodate two bottles.

Figure 15:
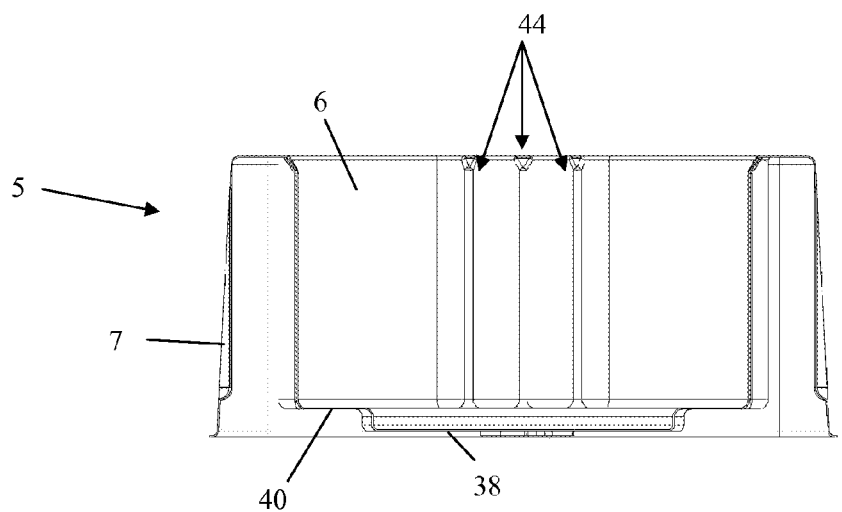
FIG. 15 shows a cross-sectional view of the base portion shown on FIG. 5.
Figure 16:
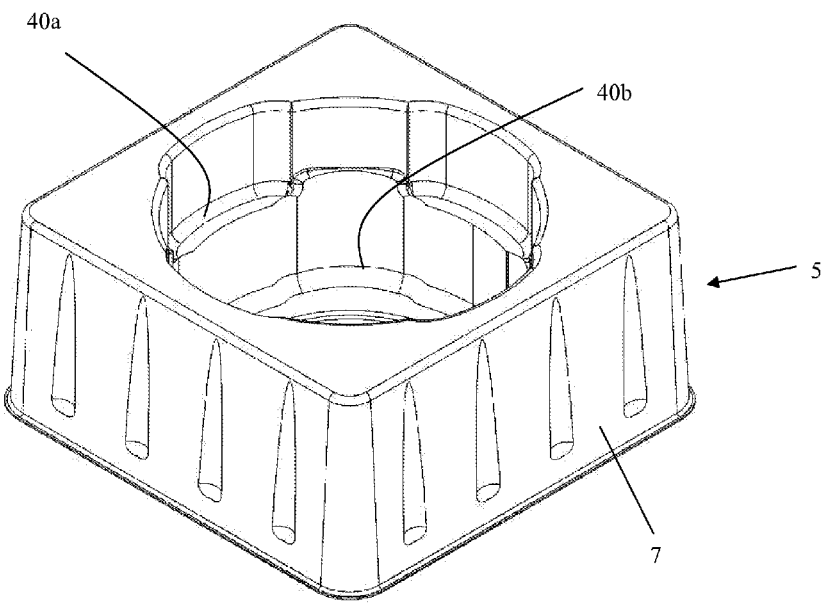
FIG. 16 is a perspective view of the base portion shown on FIG. 8.
Figure 17:
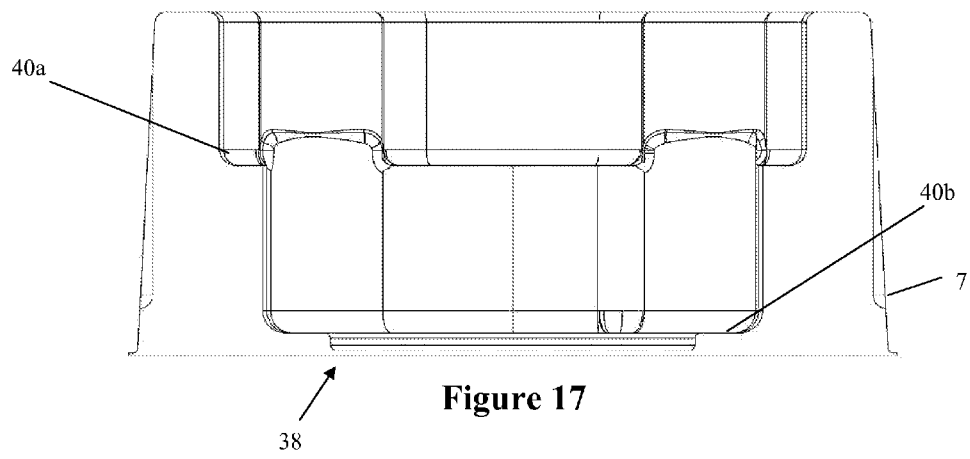
FIG. 17 is a cross-section view of the base portion of FIG. 8.

FIG. 15 is a cross-section view of base portion 5 for a beer or champagne bottle 1 showing cavity 40 inside recess 6, ribs 44, and gap 38 spaced below recess 6. FIGS. 16 and 17 show a perspective and cross-section views of base portion 5 for wine bottle 1, demonstrating cavities 40a and 40b to accommodate various diameters of bottles 1.

Figure 18:
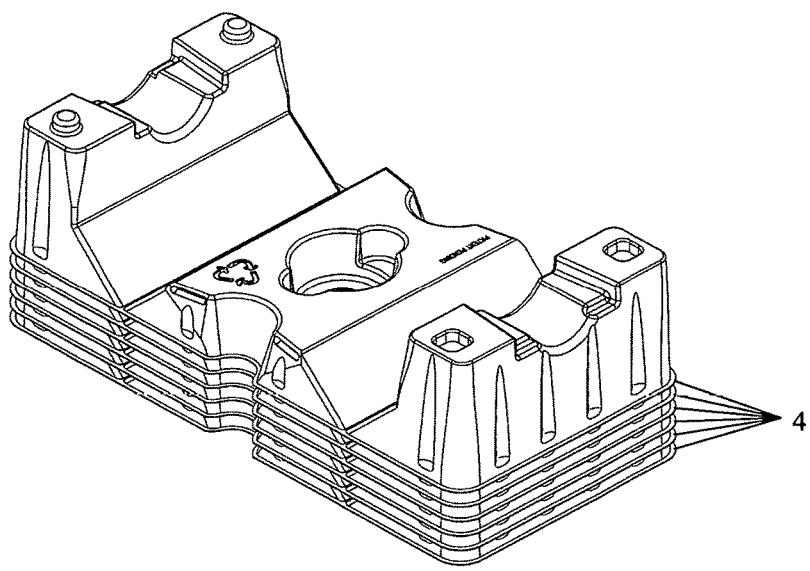
FIG. 18 is a perspective view of multiple bottle neck portions of FIG. 4 in nested or stacked configuration for storage and shipping purposes.
Figure 19:
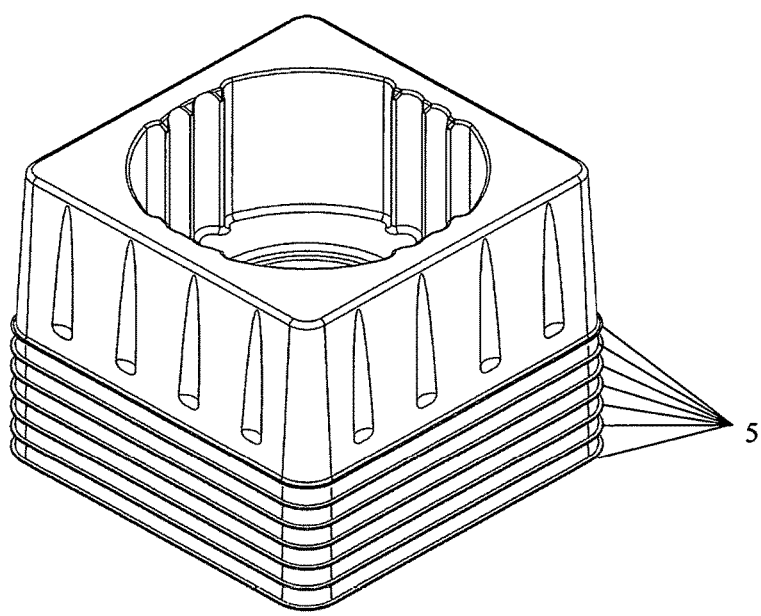
FIG. 19 is a perspective view of multiple base portions of FIG. 5 in nested or stacked configuration for storage and shipping purposes.

FIGS. 18 and 19 demonstrate neck portions 4 and base portions 5 in nested or stacked configuration for shipping and storage purposes. The shape of neck portion 4 and base portion 5 permits an identical neck portion 4 or base portion 5 to be inserted above or below one another to be nested or stacked, to save space and require a minimal shipping container for transport.

In operation, a user takes bottle 1 and inserts base of bottle 1 into wine base portion 5's recess 6. If bottle 1's base has a narrower diameter than cavity 40a, it will slip all the way to the bottom of recess 6 into cavity 40b. If bottle 1's base has a wide diameter, it will be arrested by the wider and shallower part of recess 6 at cavity 40a. There will always be a gap 38 between the lowest part of bottle 1's base and any surface upon which base portion 5 is located due to the fact that rib 7 extends below the lowest part of recess 6, said gap 38 being an integral part of assembly 2's shock absorbing characteristics, as shown on FIG. 15.

If shipping a champagne or beer bottle, user inserts base of bottle 1 into beer or champagne base portion 5, wherein the bottom of bottle 1 will abut cavity 40. If bottle 1's width is slightly wider than cavity 6, ribs 44 will collapse or fold around bottle 1's base to permit inserting said bottle 1's base into cavity 6.

Once bottle 1's base is secured in base portion 5, user inserts bottle 1, base 5 first, into box 28. Once base 5 settles at the bottom of box 28, user transforms neck portion 4 from inoperable to operable mode by folding wings 10 and 12 along hinges 16 so that half-recesses 18 form a continuous hollow cylinder with a sealed end at recess 14. User engages locking means 22 by snapping round male portion 24 into square female portion 26. Once neck portion 4 is in operable mode, user aligns neck portion 4's walls with box 28's walls, and slips neck portion 4 along the inside of box 28's walls so that said hollow cylinder comprising two half-recesses 18 slips over neck 27 of bottle 1. User keeps pushing down on neck portion 4 until bottle 1's top abuts the inside of recess 14. Notwithstanding the height of bottle 1, neck portion 4 should be located completely inside box 28. User immobilizes bottle 1 inside box 28 by manipulating flaps 30 in such a way as to prevent bottle 1 from any movement inside box 28. Bottle 1 is ready to be safely shipped.

To remove bottle 1 from box 28, the process is reversed. User opens flaps 30, slips fingers into the hollows formed by neck portion 4's finger access recesses 15, grabs neck portion 4 and pulls up so that said hollow cylinder slips off neck 27, and neck portion 4 is completely removed out of box 28. User then removes bottle 1.

As long as the structural integrity of assembly 2 is not affected, it can be reused indefinitely. If it is no longer useful or required, it can be easily recycled.

The invention claimed is:

1. A bottle shipment assembly comprising:
   a neck portion, said neck portion adapted to be locked around a length of a neck of said bottle,
   a base portion, said base portion adapted to fit around a bottom portion of said bottle, and
   an exterior box, said exterior box adapted to securely and immovably house said bottle fitted with said neck portion and said base portion,
   said neck portion and said base portion are made of molded plastic, and adapted to accommodate many different shapes and sizes of bottles, capable of being installed within a matter of seconds, and can withstand the most severe shocks and impacts that are associated with standard shipping conditions;
   wherein said assembly is adapted to withstand shock and impact during shipping condition, and
   wherein said neck portion comprises a center portion provided with two wings adapted to move from inoperable to operable position, said center portion provided with a head engagement recess adapted to slip over the neck of said bottle,
   wherein said wings are locked together by locking means comprising male and female portions that are adapted to be locked to each other in a snap fastener locking configuration around said neck portion of said bottle in said operable position,
   wherein said neck portion is provided with recesses to accommodate fingers,
   wherein said bottle is provided to be pulled out from said exterior box by upwardly force on said neck portion when said wings are locked in said operable position,
   wherein said neck portion and said base portions are immobilized within said exterior box to create space around said bottle and to absorb shock and impacts associated with shipment, and
   wherein said assembly is adapted to accommodate bottles of various configurations and to withstand shock and impacts associated with shipment.

2. A bottle shipment assembly according to claim 1, wherein said center portion has a substantially square configuration, wherein outer perimeter of said center portion is adapted to fit within the interior of said exterior box,
   wherein said wings comprise a male wing and a female wing, wherein said wings are attached to said central portion by means of hinges, wherein said hinges are adapted to facilitate movements of said wings from inoperable or storage position into said operable position facilitating secure locking of the neck of said bottle by said locking means.

3. A bottle shipment assembly according to claim 2, wherein the locking means of said male wing comprises protrusions extending from a lower extremity of said male wing and wherein the locking means of said female wing comprises recesses embedded in a lower extremity of said female wing,
   wherein the locking means of said male portion and the locking means of said female portion are adapted to be locked to each other around the neck of said bottle in a snap fastener locking configuration, and
   wherein said male and female wings are provided with matching half-recesses formed in the lower extremities of said male and female wings, wherein said recesses are adapted to accommodate the neck of said bottle in operable position.

4. A bottle shipment assembly according to claim 1, wherein said neck portion is provided with a number of stress crimps formed along a vertical opposite walls of said neck portions, said stress crimps enhancing rigidity of said neck portion by interrupting bending forces that may be exerted to said assembly during shipping condition, wherein said wings are provided with a number of stress crimps formed along vertical walls of said wings, said stress crimps are provided to enhance rigidity of said neck portion in operable position.

5. A bottle shipment assembly according to claim 1, wherein said base portion has a substantially square configuration, said base portion provided with a recess formed substantially in the center of said base portion, wherein said recess is adapted to receive the bottom portion of said bottle, wherein said recess has a substantially concave configuration, said base portion is provided with a gap creating a pocket of space between said recess and a bottom of said exterior box to withstand shock and impacts associated with shipment, wherein said base portion is provided with a rib portion having configuration of an outer shell flanging outwardly from a top to a bottom relative to the vertical plane of the bottle accommodated in said base portion, and wherein said rib portion is provided with a number of stress crimps formed around said rib portion, wherein said crimps have a vertical orientation and are provided to enhance rigidity of said base portion in operable position.

6. A bottle shipment assembly according claim 1, wherein said neck portion and said base portions are adapted to be nested in inoperable position one within another to save space during storage.

7. A bottle shipment assembly according to claim 5, wherein said recess forms a number of cavities of various diameters adapted to accommodate bottles with bottom portions of various diameters.

\* \* \* \* \*